United States Patent
Radziewicz et al.

(10) Patent No.: US 7,873,148 B2
(45) Date of Patent: Jan. 18, 2011

(54) HANDSET ORIGINATED PROGRAMMABLE RINGBACK REPLACEMENT SYSTEM

(76) Inventors: Clifford J. Radziewicz, 36 Francis Dr., Hillsborough, NJ (US) 08844; Mark R. Gregorek, 53 James Brite Cir., Mahwah, NJ (US) 07430; Jeffrey C. Dillow, 15 Natures Way, Sparta, NJ (US) 07871

( * ) Notice: Subject to any disclaimer, the term of this patent is extended or adjusted under 35 U.S.C. 154(b) by 1345 days.

(21) Appl. No.: 11/157,212

(22) Filed: Jun. 20, 2005

(65) Prior Publication Data

US 2007/0003040 A1    Jan. 4, 2007

(51) Int. Cl.
*H04M 1/64* (2006.01)
(52) U.S. Cl. .................. 379/67.1; 379/41; 379/51; 379/88.23; 379/88.27; 379/211.01
(58) Field of Classification Search .................. 379/41, 379/51, 67.1, 68, 77, 85, 88.22, 88.23, 88.27, 379/350, 373.04, 418
See application file for complete search history.

(56) References Cited

U.S. PATENT DOCUMENTS

| | | | | |
|---|---|---|---|---|
| 4,811,382 A * | 3/1989 | Sleevi | ...................... | 379/67.1 |
| 5,937,047 A * | 8/1999 | Stabler | ...................... | 379/67.1 |
| 7,379,760 B2 * | 5/2008 | Ishii | .......................... | 455/567 |
| 7,512,421 B2 * | 3/2009 | Kim et al. | ................... | 455/567 |
| 2005/0105706 A1 * | 5/2005 | Kokkinen | ............. | 379/201.01 |
| 2006/0147021 A1 * | 7/2006 | Batni et al. | ............ | 379/221.08 |
| 2007/0127707 A1 * | 6/2007 | Koser et al. | ............ | 379/373.03 |

* cited by examiner

*Primary Examiner*—Curtis Kuntz
*Assistant Examiner*—Yosef K Laekemariam
(74) *Attorney, Agent, or Firm*—Ward & Olvio

(57) ABSTRACT

A handset-originated ringback replacement system for modifying or replacing certain communications network tones is disclosed. Communications devices activate and interact with the handset-originated ringback replacement system to allow for modification of the network service.

19 Claims, 13 Drawing Sheets

HANDSET ORIGINATED PROGRAMMABLE RINGBACK REPLACEMENT SYSTEM

FIELD OF THE INVENTION

The present invention relates generally to the customization of a communications network and, more particularly, to the customization of a communications network including replacement ringback announcements and the system for delivering replacement ringback content from a terminal device.

BACKGROUND OF THE INVENTION

Most conventional communications networks today, particularly existing telephone networks, provide a calling party with an audible ringback signal when an intended called network address or station line is idle and a busy signal when the intended called network address or station line is already in use (i.e., the telephone or other device at the called network address is being used). Conventional networks also provide a calling party with an audible dial tone signal when the telephone or other device at the calling station signals the network that they wish to initiate a call or network communication and a line is available. Most conventional communications networks today, particularly existing telephone networks, also provide advanced features, such as call waiting. The call waiting feature allows a station or device already connected to another station or device to temporarily disconnect from a first call and receive a second incoming call, and then switch between the calling parties.

For example, U.S. Pat. Nos. 5,557,658, 5,428,670, and 5,321,740 to Gregorek et. al, incorporated herein by reference, disclose a system for selectively modifying or replacing at least a portion of a call progress signal, including the conventional aforementioned ringback signal, dial tone, busy signal, and call waiting idle time, with prerecorded announcements and/or audio/video programming. These announcements and/or programming provide more information to a calling party. The replacement announcements and tones can be tailored to a specific calling party and are thus associated with a calling party's unique network address or telephone number.

Custom ringback announcements allow for an additional level of flexibility and personalization of a user's communication network service. To customize the system, a user of a replacement ringback system might wish to deliver, for example, audio/video programming, interactive games, a joke, a personalized message, or an informational message to a calling party to supplement and/or replace the conventional ringback tones played to the calling party. Furthermore, replacement content can be customized for a specific calling party or group of calling parties. The replacement ringback system offers a convenient and simple way to extend a caller's communication experience and takes advantage of a previously unutilized call transmission period.

In addition, replacement ringback tones and announcements offer almost limitless applications in the marketing industry. A caller experiences a rather large amount of unused idle time when waiting for a called party to answer his or her telephone. In addition, a caller may be put on hold for several minutes while the called party answers another inbound call (e.g., a called party may place an initial caller on call-waiting or hold to answer a second inbound call). Since ringback tones can be played to all parties, regardless of the called party's or calling party's own carrier or calling transmission means (i.e., whether the caller is calling from a mobile line or land line, etc.), replacement ringback tones are an ideal medium for advertising. Substantial revenue can be gained by taking advantage of this idle time to deliver advertisements pertaining to consumer goods, products, services, etc. provided by a particular corporation or individual. Further, since communication devices are ubiquitous and universally used, ringback tones have the potential to reach a large, targeted audience very quickly and efficiently. For example, businesses may use replacement ringback tones to deliver company slogans, jingles, and promotions to increase exposure and publicity.

As the adoption of the technology identified in the above-referenced application is emerging, certain drawbacks in the user interface for enabling the functionality of the application are arising. For example, a subscriber is usually required to notify the network provider in advance if the subscriber desires a new ringback replacement association via a Short Message Service (SMS) message, email, or telephone call to the communications network's voice response system or call center. This advance notification, for example, usually contains at least the network address or addresses to be associated with the new ringback content and an identification of the actual replacement ringback content. The network provider then makes the necessary changes to the subscriber's service to associate the appropriate network address or addresses with the desired ringback content. In addition, notification and confirmation by external means are often required to update or change the ringback content for an already-existing ringback association. For example, an exchange of emails may be required to effect the change in service, or a visit to a website may be necessary to set up replacement ringback functionality. This often inconvenient and time-consuming method of updating or adding new ringback content to a user's service discourages subscribers of a ringback replacement service from frequently modifying or adding new ringback replacement associations, thus reducing potential revenue by deterring regular and repeated ringback content purchasing and utilization.

In addition, depending on the setup of the communications network and the handset technology, a replacement ringback announcement can be selected by and played from a user's terminal device (i.e. a user's handset or station) instead of the communications network. In most conventional telephone networks, a network server or network peripheral typically selects and plays ringback content to a caller. However, with the emergence of voice over IP (VoIP), many vendors and hardware manufacturers are adopting Session Initiation Protocol (SIP) or Secure Session Initiation Protocol (SIPS), for example, as the standard for IP-based telephony connectivity. In a SIP, SIPS, or like network, the terminal device is responsible for selecting and playing the replacement ringback content to a calling party. In other networks, including, for example, H.323 and Secure Real-time Transport Protocol (SRTP) networks, ringback replacement announcements may be selected and played by either the terminal device or cached and played by a network server. In addition, the actual replacement ringback announcement can be stored at a variety of locations, including on the terminal device itself, on a server remote to the terminal device operated by the terminal device, on a server remote to the terminal device operated by the network provider, or on a server remote to the terminal device operated by a third party. This plurality of ringback announcement source locations and the decentralization of ringback responsibility to the terminal device prove confusing and difficult to manage for conventional replacement ringback systems.

It would be advantageous if the users of a communications network that supports ringback announcements played from the terminal device could access a simple system for modifying or adding replacement ringback content to the user's service. It would also be beneficial if this system could access a variety of replacement ringback source locations, including local databases and storage, the communications network provider's remote databases, and third-party sources, for the purpose of delivering replacement ringback content from these sources to a calling party. It would also be advantageous if function keys integrated with the user's handset could be used to access a system for associating ringback content with specified network addresses or telephone numbers. Thus a seamless system is needed that is accessed directly from a user's handset or station, for easily modifying or adding ringback associations using a familiar means, such as the menu or prompt systems already integrated with a handset or station.

SUMMARY OF THE INVENTION

The present invention comprises a handset-originated ringback replacement system, which is capable of delivering replacement ringback content to calling parties from a terminal device (i.e. directly from a user's handset or station). The present invention is also directed to a system for creating ringback associations directly from a user's handset or station. Ringback associations are simple logic used to determine what ringback content is played to which incoming callers. For example, a ringback association might specify that a certain advertisement is to be played to all incoming callers calling from the "212"-New York City area code. Another ringback association might specify the playing of The Star-Spangled Banner to all incoming callers calling on July 4 of each year. Means are provided for accessing the handset-originated replacement ringback system via hard or soft keys on a user's handset, an attachable keypad or keyboard, or a voice-activated speech recognition module. Means are also provided for committing ringback association additions to the terminal device. The present invention connects to a local or remote storage device for the user to select a desired ringback announcement (for example, an audio/video clip, an advertisement, an interactive game, news footage, or some other programming material). Then the subscriber either manually inputs or automatically chooses by speaking predetermined voice commands translated to common phonemes a desired network address or telephone number to be associated with the previously selected ringback announcement. As a result, the handset-originated ringback system plays the newly associated announcement to the calling party whenever the selected network address or telephone number calls the subscriber.

The present system is also directed to a handset-originated replacement ringback system which is capable of modifying currently associated network addresses or telephone numbers with new ringback announcements (or revert to conventional tones) directly from a user's handset or station. The subscriber selects the currently associated network address or telephone number and then chooses a new replacement ringback announcement. The ringback system then plays the newly-associated announcement to the calling party whenever the calling party calls the subscriber from the selected network address or telephone number. For example, a user, who knows that one of the user's frequent callers has an affinity for classical music, might update the ringback association for that frequent caller as new classical releases become available.

BRIEF DESCRIPTION OF THE DRAWINGS

A further understanding of the present invention can be obtained by reference to a preferred embodiment as set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, and operating structures in accordance with the present invention many be embodied in a wide variety of forms and modes, some of which may be quite different from those in the disclosed embodiment. Consequently, the specific structural and functional details disclosed herein are merely representative, yet in that regard, they are deemed to afford the best embodiment for the purposes of disclosure and to provide a basis for the claims herein, which define the scope of the present invention. The following presents a detailed description of a preferred embodiment (as well as some alternative embodiments) of the present invention.

Figure 1:
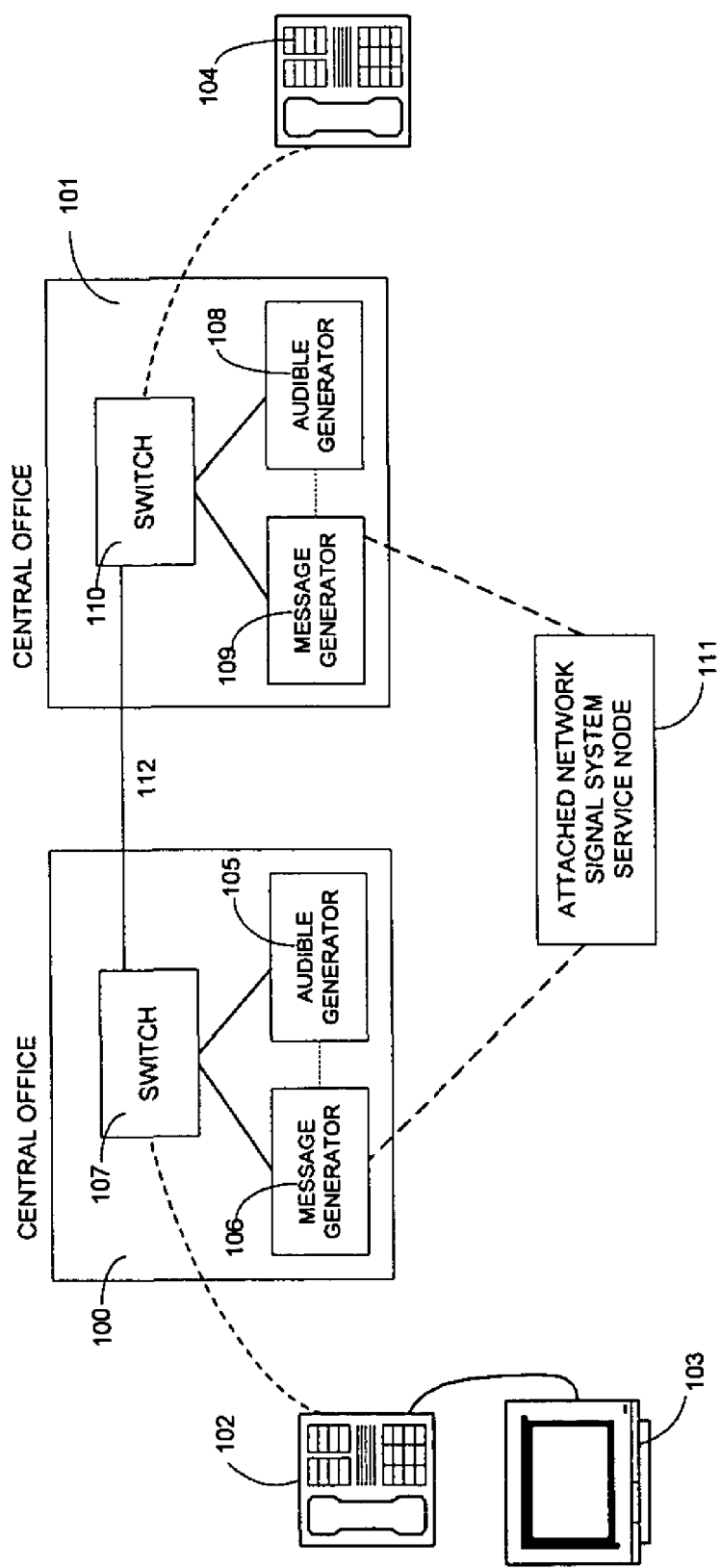
FIG. 1 (PRIOR ART) is a block diagram of a common network-originated ringback replacement system.

Referring to the drawings wherein like numerals indicate like elements throughout, there is shown in FIG. 1 (PRIOR ART) a network-originated system for supplying replacement ringback content in accordance with a typical ringback control system. As is well known in the art, when a user of first telephone 102 initiates a call, a connection is formed with first switch 107 at first local central office 100, which is usually associated with a local telephone company. First switch 107 typically transmits a dial tone back to first telephone 102 to indicate the availability of the telephone service. The telephone number dialed or otherwise entered by the calling party using telephone 102 or an associated device is transmitted to local central office 100 as a series of signals which are detected by switch 107. Computerized switch 107 refers to a network controller or communications network traffic switching and control mechanism, such as a central office or premises-based audio, data, video, or hybrid switch, a packet switch, or Asynchronous Transfer Mode (ATM) switch, or any associated signaling network, or service switching system which routes, monitors, and/or handles and controls calls over a communications network. Switch 107 is responsible for determining the destination (network address) of the call based upon the transmitted signal (i.e., the number dialed). Switch 107 transmits the call initiated by the user of first telephone 102 over communications network 112 toward an identified network address or called station which in the present embodiment comprises second telephone 104, but could comprise any other type of communication device. The called network address or station is identified by the telephone number or network address entered by the calling party at first telephone 102. Communication network 112 could be a local exchange network, interexchange network, long distance network, international network, telecommunications network, cable television network, broadcast network, switched network, dedicated network, or a hybrid type of the foregoing networks or any type of network similar to the aforementioned networks.

The call from the calling party is received by second computerized switch 110 located at second local central office 101 which determines the status of the second telephone 104 (i.e., whether second telephone 104 is in a busy state or in an idle state). Attached network signaling system service node 111 can also determine the busy/idle status of the called network address or station line. The specific procedure by which switch 110 or attached network signaling system service node 111 determines the busy/idle status of the called network address or station line is common and well-known to those skilled in the art.

Depending upon the configuration of the network, either audible signal generator 105 or 108 can transmit the call progress signals to the user of first telephone 102. For example, when a user of first telephone 102 initiates a communication session with second telephone 104, audible signal generator 105 and message generator 106 may provide signals and/or announcements to the user of first telephone 102. Message generator 106 is connected to switch 107 and is capable of supplementing and/or replacing the signals generated by the audible signal generator 105. Switch 107 or attached network signaling system service node 111 determines whether the audible signal generator 105 or the message generator 106 is activated. When a user of first telephone 102 initiates a communication session with second telephone 104, switch 107 or the attached network signaling system service node 111 activates the audible signal generator 105 to provide a conventional audible ringback signal and activates the message generator 106 to play a series of prerecorded announcements (i.e., replacement ringback content) to the user of first telephone 102.

Announcements are enabled by inserting a software subroutine into the call processing software of the network. The various mechanisms for incorporating software into the call processing system of the network are well-known to those skilled in the art. The software subroutine causes call processing procedures to be modified and allows message generator 106 to become an integral part of the call completion sequence.

Message generator 106 can also play certain messages based on the time of day, day of week, month of year or any other time frame reference. A clock located within the message generator 106 monitors the time of day, day of week, and month of year. When a call is placed to second telephone 104 from first telephone 102, and message generator 106 has been signaled to initiate a message sequence, the information from the clock is read by message generator 106 and is compared to information located in a look-up table in the memory of message generator 106 to determine which messages are to be played. For example, a user of the present system could specify a prerecorded video to be transmitted to a calling party calling the user from video-telephone number "212-555-1212" on January 25 of each year (the user's birthday, for example) whenever video-telephone "212-555-1212" calls the user on January 25. Message generator 106 continually retrieves the designated messages in predetermined segments of time until called telephone 104 is answered or the call is abandoned. It should be appreciated that, if desired, live announcements may be provided under control of message generator 106.

If message generator 106 is set to determine which announcements are to be played based upon the area code and telephone number of first telephone 102, message generator 106 can read the telephone number of the calling party as provided by the telephone network (e.g., message generator 106 can use an automatic number identification (ANI) system or similar identification system(s) which are well-known in the art to identify the area code, telephone number, or other characteristics of the calling party) and determine the geographical location of the calling party by matching the telephone number with a location provided by an updateable look-up table maintained by message generator 106. Message generator 106 determines which announcements are designated for a particular area code and telephone exchange and plays the prerecorded messages in a predetermined segment of time until called telephone 104 is answered or until the calling party abandons the call.

Figure 2:
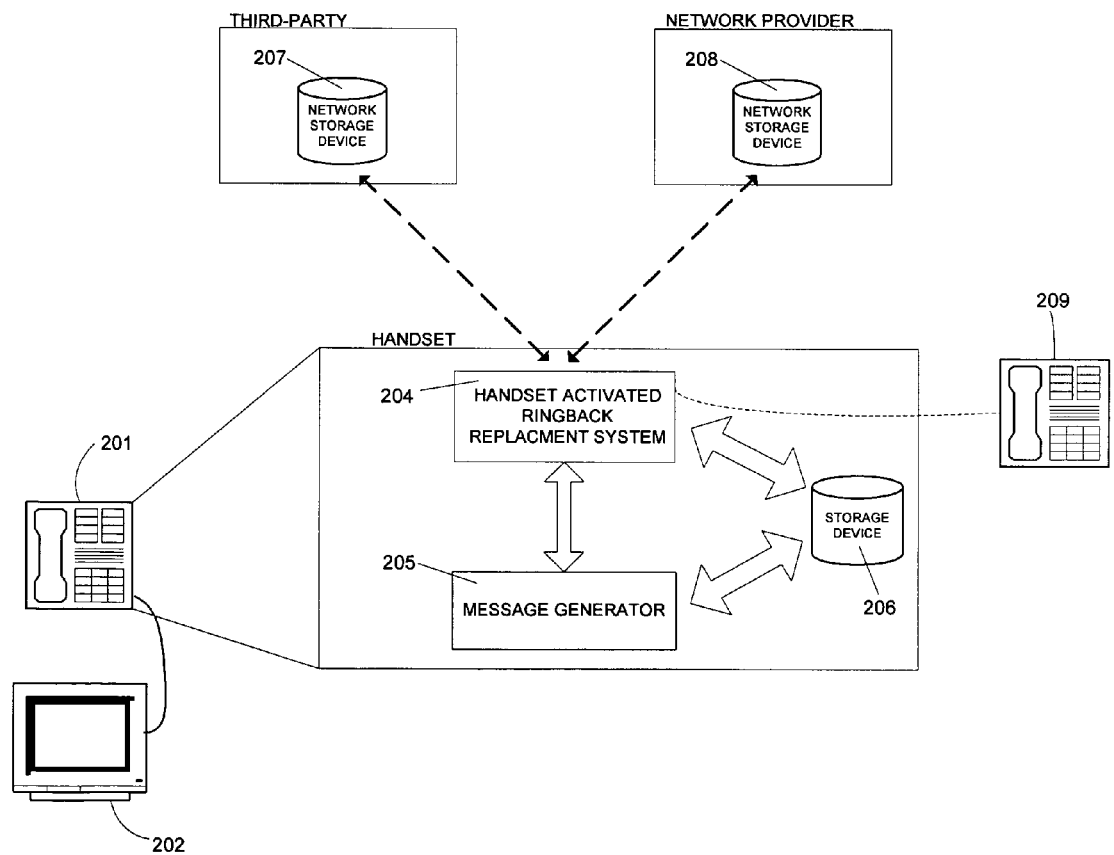
FIG. 2 is a block diagram in accordance with the handset-originated replacement ringback system of the present invention.

Now referring to FIG. 2, a schematic block diagram of a handset-originated replacement ringback system is shown in accordance with the preferred embodiment of the present invention. The present invention is designed for use with any type of communications network including any network capable of transmitting voice, data, video, multi-media, real time, store and forward, interactive, hybrid types of information, or other similar information services. The communications network may be provided by a private or publiclyowned local exchange, interexchange, long distance, international, telecommunications, cable television, broadcast, switched, dedicated, hybrid types of network providers, or other like networks. The communication network provided by these network providers may utilize wireless, facilities-based, satellite-based, hybrid types of transmission schemes and/or mechanisms, or other systems of similar function. For the sake of brevity and simplicity, the embodiments of the invention illustrated in the figures are specifically directed to a standard or typical telephone system used for providing voice communication between two individual network addresses (e.g., in the present embodiment, these network addresses correlate to telephone stations or telephones). However, it should be clearly understood by those skilled in the art from this disclosure that the present invention is not limited to access from such standard telephone stations or to telephone station communications systems. In addition, while in the described embodiment, one or both of the telephone stations are illustrated as being typical or standard telephone instruments, the terms "station" and "handset" could refer to any device or object which may be connected to or be an integral part of a communication network. A communication network may allow for the initiation, receipt and/or interaction of audio and/or visual information. This information may include voice, data, video, multi-media, real-time, store and forward, interactive or hybrid types of information. It should also be clearly understood that the terms "station" and "handset" should be read to include, but not be limited to, devices such as cellular telephones, personal digital assistants, digital personal organizers, televisions, video monitors, video telephones, computers, television set-top converters, modems, video servers, front end processors, other communications networks, and combinations or hybrids thereof.

Still referring to FIG. 2, ringback association system 204 is in communication with local storage device 206 and message generator 205. As is common in the art, network storage device 206 maintains the ringback replacement content on behalf of the user of handset 201 in indexed files. Local storage device 206 may hold user-created announcements, such as video clips or voice messages, as well as downloaded announcements, such as commercial music clips, music videos, interactive games, and news footage, for example. Although local storage device 206 is depicted as an internal handset device, it is contemplated that local storage device 206 may be external to the handset. As also known in the art, each file of ringback replacement content can be accessed by a unique identification alphanumeric, assigned either by message generator 205 or by local storage device 206. By pressing a hard, soft, or touch key on handset 201, or through the use of an attachable input instrument or voice recognition module (or like device), handset 201 connects to handset-originated ringback replacement system 204. For example, handset-originated ringback replacement system 204 is implemented in the preferred embodiment as a software product stored in non-volatile memory within handset 201; however, it is contemplated that the present system could be implemented in firmware, hardware, or a combination of the aforementioned implementation methods within handset 201. Handset-originated ringback replacement system 204 is also optionally in communication with remote storage device 208 operated by a communications network provider and remote storage device 207 operated by a third-party. Handset-originated ringback replacement system 204 can access replacement ringback content from one or more of storage devices 206, 207, and 208. The system may periodically query all remote ringback replacement storage devices for a listing of available ringback content and associated identification alphanumerics. Handset-originated ringback replacement system 204 collects answers from all remote storage devices and may write the title of each ringback announcement and associated unique alphanumeric to a file stored on handset 1. The communication link between handset-originated ringback replacement system 204 and network storage devices 207 and 208 may comprise a portion of the main telecommunication network accessible by telephone 201, or may be a supplemental, peripheral, or ad-hoc network designed only for accessing ringback update content. In the preferred embodiment, the communication between handset 201 and network storage devices 207 and 208 is a wireless link, comprising part of a Cellular Digital Packet Data (CDPD), High Speed Circuit Switched Data (HSCSD), Packet Data Cellular (PDC), General Packet Radio Service (GPRS), Bluetooth, Wi-Fi, Local Multipoint Distribution Service (LMDS), Multichannel Multipoint Distribution Service (MMDS), or other wireless network, including these not yet implemented, utilizing Wireless Application Protocol (WAP) or the equivalent thereof, but it will be appreciated by those skilled in the art that communication link 203 could comprise a portion of any wired or wireless communication network over any communication or network protocol designed for data transmission. For example, the communication between handset-originated ringback replacement system 204 and remote storage devices 207 and 208 could alternatively commence over a messaging service (e.g. SMS, EMS, or MMS), or any other wired or wireless communications facility available for access by handset 1.

Handset 201 could also be connected to (or comprise an integrated) video display unit 202, such as a computer terminal, video terminal, LCD screen, telephone monitor, or matrix display for the transmission of video signals. It is to be understood by those skilled in the art that ringback replacement system 204 is not limited to access from a conventional wireless telephone system. For example, handset-originated replacement ringback system 204 can be accessed from any state of the art communications device, including web-enabled cellular telephones, mobile and desktop computers, and digital personal assistants or hybrid devices with telephony or communications capabilities.

Handset-originated ringback replacement system 204 monitors all call initiation requests with handset 201. When another caller 209 attempts to initiate communication with handset 201, handset-originated ringback replacement system 204 analyzes the incoming station identification. As is common in the art, incoming station identification is specific to the underlying communications network and can include a network address (e.g., an IP address), a Uniform Resource Locator (URL), a telephone number obtained from "caller ID" or automatic number identification (ANI), or any other station identifying means capable of being ascertained by any network accessible by handset 201. For example, SIP signaling messages, Q.931 signaling messages, or packet headers might be analyzed for calling party address information. Simple logic within handset-originated ringback replacement system 204 compares this incoming identification information with all the replacement ringback associations created on handset 1. If an association matches the an incoming network address or telephone number, message generator 205 plays the appropriate replacement ringback content when the underlying network protocol or service requests the caller's ringback content.

Figure 3:
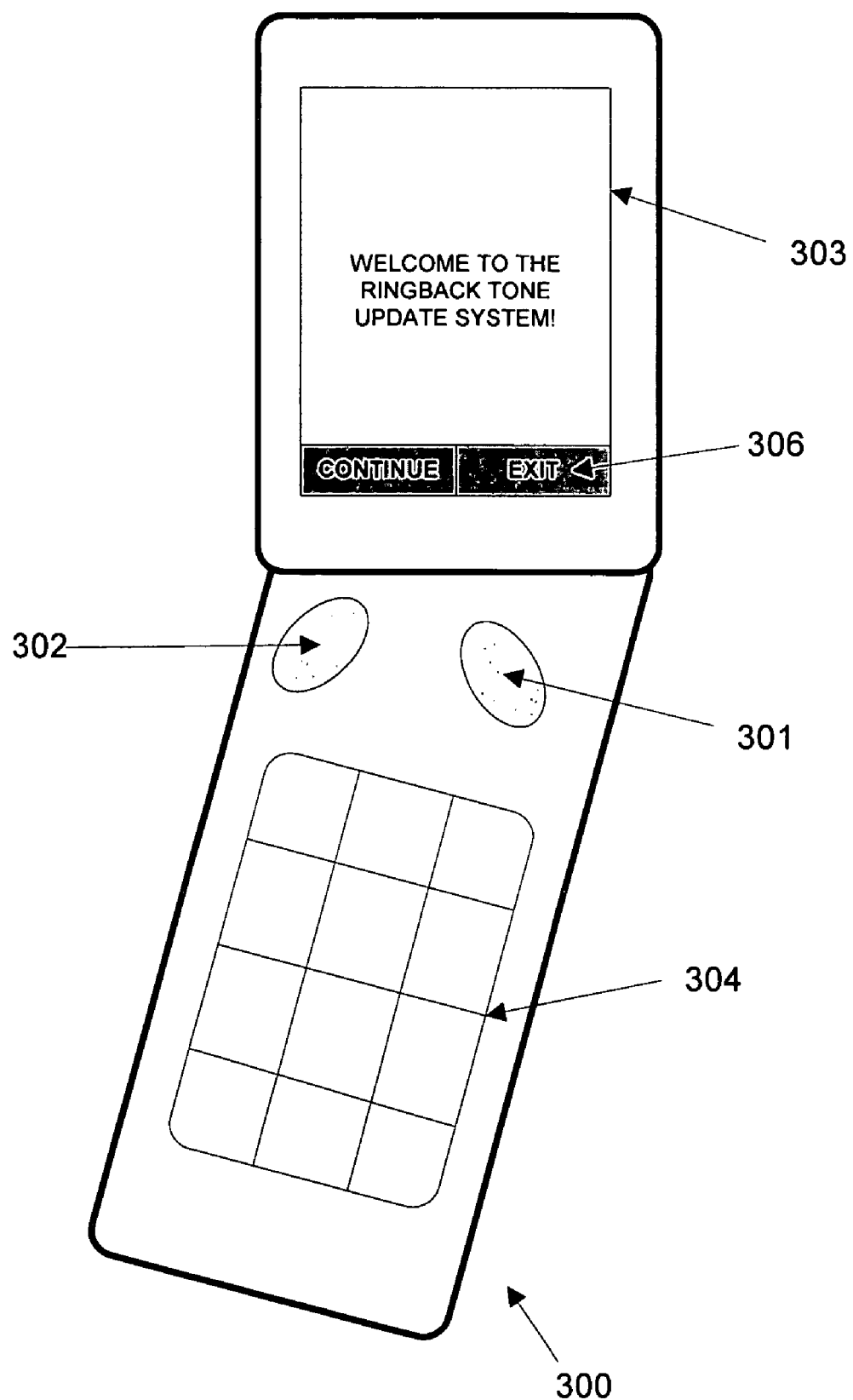
FIG. 3 depicts a cellular telephone with a display and hard, soft, and touch keys used to activate and interact with the handset-originated ringback replacement system.

As shown in FIG. 3, depicted is cellular telephone 300 with integrated display 303 that may be used in accordance with the preferred embodiment of the present system. Integrated display 303 may be a liquid crystal, LED, plasma, active-matrix, flat-panel, or any other display or device used to output video or graphical signals. If integrated display 303 comprises a touch screen, the handset-originated ringback system may be accessed by a user touching a pen or stylus to the appropriate touch buttons 306 on the touch screen. Navigation and data entry are also supported via touch buttons preferably positioned on integrated display 303. Alternatively, the user accesses the ringback system by utilizing soft keys 301 or hard keys 302 integrated within or positioned local to keypad 304. Cellular telephone 300 may have a secondary attachable keypad or keyboard that facilitates access to and use of the ringback system. In addition to using hard, soft, touch, or attachable keys, a user of the ringback system may use a voice recognition module integrated within cellular telephone 300 to access, navigate, and input selections into the replacement ringback system. As is well-known in the art, speech recognition may be used to dial telephone numbers, access applications and features, navigate screens, and input data. With the use of voice recognition, a user may access and control the present system without the use of a traditional input device; however, a combination of the input systems and methods may be utilized.

Figure 4:
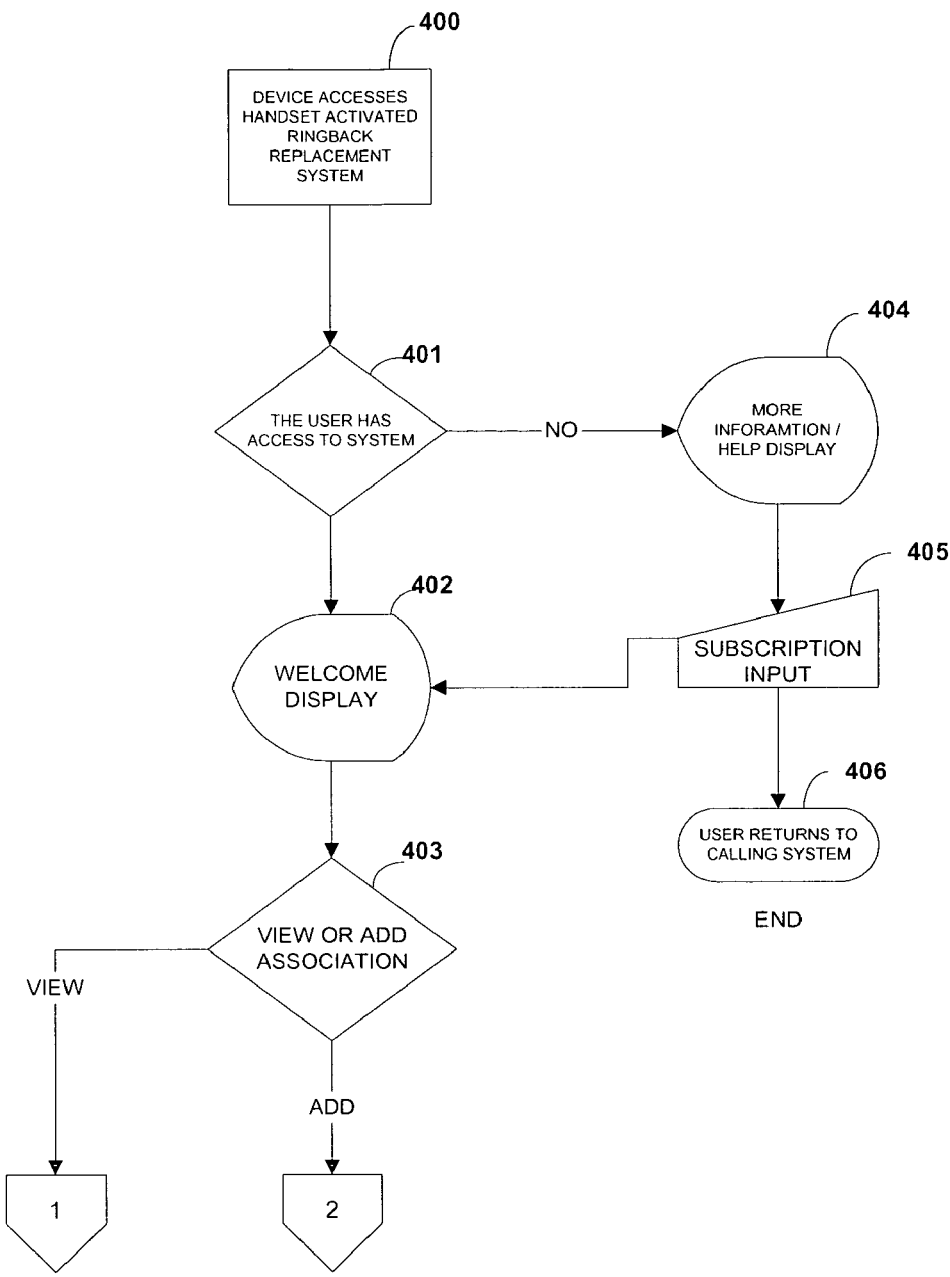
FIG. 4 is a flow diagram illustrating the initial interaction between a user and the handset-originated replacement ringback system.

Now referring to FIG. 4, a flowchart of the preferred embodiment of the present invention is shown depicting the interaction between a user and the handset-originated replacement ringback system. A user accesses handset-originated replacement ringback system 400 using one of the access methods described above. The first step of interaction between the user and the handset-originated replacement ringback system is authorization routine 401 which verifies the current status of the user. Within authorization routine 401, user status is confirmed and verified to determine if access to the ringback system should be granted. For example, if the user is not currently authorized to use the ringback system, the user may be required to subscribe to the ringback service. If the user is unauthorized, authorization routine 401 presents the user with help screen 404. Help screen 404 prompts the user to verify or confirm that subscription to the ringback service is desired. If subscription to the service is requested, the user may be required to input billing information or personal identifying information, such as a password, PIN, or social security or account number, at subscription input stage 405 in order to complete subscription to the ringback service. Data is provided to the system through hard, soft, attachable, or touch keys, or via voice recognition. If the subscription process does not complete successfully, or if the user chooses to cancel the subscription process, the user is returned to the calling system at stage 406.

In addition, if the user's account is determined to be presently delinquent, authorization stage 401 requests the user to provide immediate payment information via help screen 404 and subscription input stage 405 in order to bring the user's account into good standing. This may be achieved by authorizing an automatic one-time debit of the user's credit or checking account linked with the user's account, or by presenting the user with subscription input screen 405 so that the user might type, touch, or speak the user's billing information into the system. If the user's account is not determined to be in good standing at the conclusion of subscription input screen 405, the user is returned to the calling system at stage 406.

On the other hand, an authorized user, or a user who has presently become authorized or subscribed, is presented with welcome display 402 indicating that the user has successfully activated the handset-originated replacement ringback system. Welcome display 402 may additionally be supplemented to display targeted advertising to the user accessing the handset-originated replacement ringback system. The advertising may be selected based on the current location of the user accessing the system (determined by the user's network address or telephone number), or targeted advertising may be determined based on user-supplied or user-derived interests. For example, a user accessing the system from a New York City area code might be presented with local advertising or information important to New York City residents or visitors. In another example, a user who has expressed an interest in outdoor cycling via an online survey sponsored by the communication network might receive advertisements regarding bicycles and related supplies at welcome display 402. Additionally, welcome display 402 might alert the user to new replacement ringback content available on the network. The ringback system includes logic for determining a genre or category of content preferred by the current user (based on previous content selections or user-supplied information) and automatically alerts the user to new content matching the user's interests. At view or add association stage 403, the user next chooses whether to view or add a ringback association. In one embodiment, the user enters the appropriate key (e.g., selects "1") to view or update a ringback association, and the user enters a distinct appropriate key (e.g., selects "2") to add a new association. In another embodiment, at view or add association stage 403 the user presses a soft key on the user's handset to highlight and select "CHANGE" or "ADD" on the station's integrated display.

Figure 5:
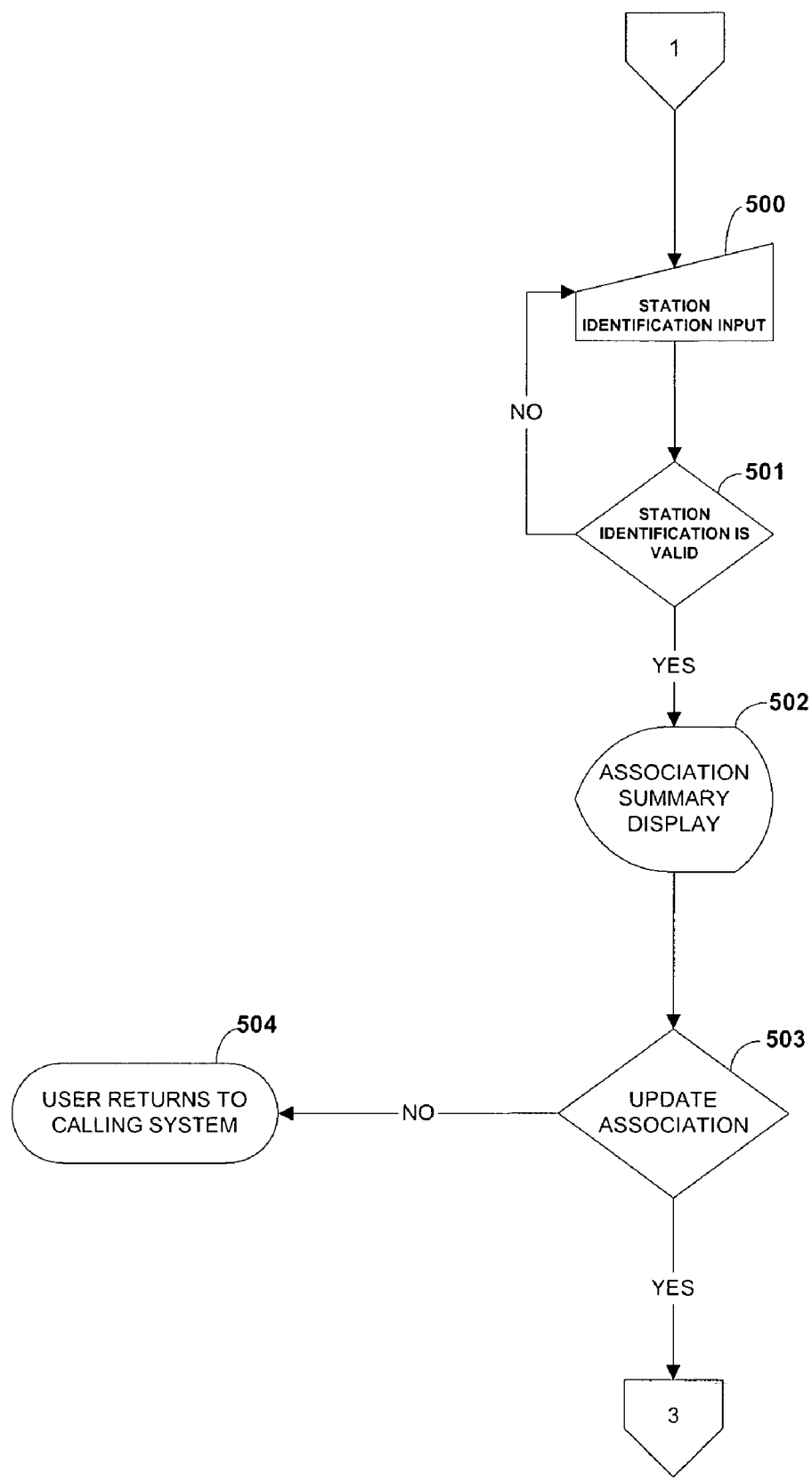
FIG. 5 is a flow diagram illustrating the interaction between a user and the handset-originated replacement ringback system for viewing a ringback association.

To view or update a replacement ringback association, the user follows the interaction depicted in FIG. 5. First, the user enters the desired calling station identification at station identification input 500. The system verifies the inputted identification at station validation stage 501, and if a valid identification is entered, the system presents a summary display 502 of the association with the specified calling station identification. If an invalid station identification is entered, the user is returned to station identification input 500 until a valid station identification is entered. Once the summary display 502 is presented to the user, the user can select to exit the system or update the association at update association stage 503. If the user chooses not to update the association, the system returns the user to the calling system at exit stage 504.

Figure 6:
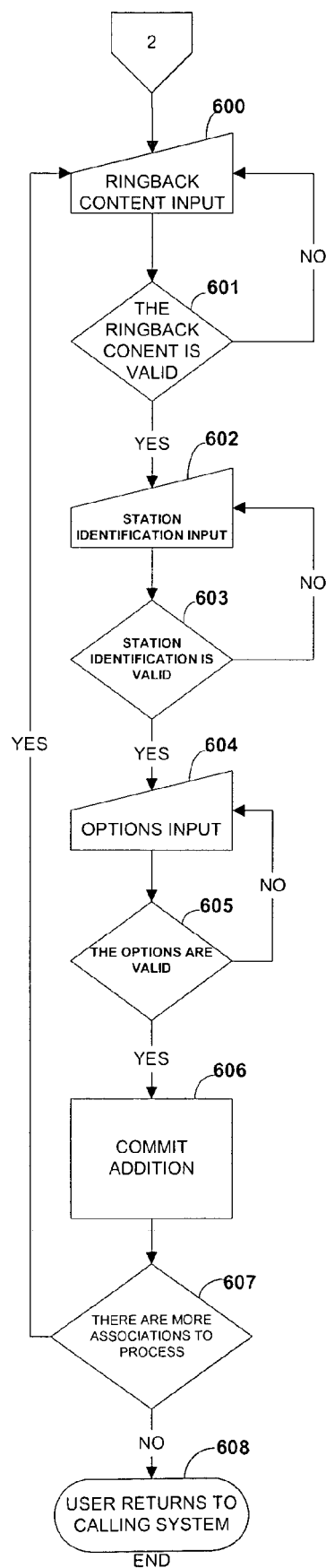
FIG. 6 is a flow diagram illustrating the interaction between a user and the handset-originated replacement ringback system for adding a new ringback association.

To add a new ringback replacement association, the user follows the interaction depicted in FIG. 6. The user first enters a unique alphanumeric corresponding to the desired ringback announcement at ringback content input 600. Unique ringback alphanumeric codes can be accessible through numerous sources, including, for example, ringback alphanumeric codes may be published on the communication network's website or the codes could be periodically downloaded to a file on the user's handset. In one embodiment, unique alphanumeric identification codes corresponding to available ringback content are cached in a file on the user's handset. In an alternate embodiment, the system directly queries the communications network for its list of available ringback announcements. If the ringback announcement alphanumeric identification codes are cached on the handset in a file, this file may contain the title and the identification alphanumeric of each ringback announcement stored on the network provider's storage device(s). In addition, a short description of the ringback content and its genre are included, if available. The user looks up the desired replacement ringback announcement in the file and inputs the identification alphanumeric corresponding to the desired announcement. If the user desires to remove an association, the user enters the null ringback identification alphanumeric at ringback content input stage 600 (e.g., the user selects "0"). The null announcement erases an association and reverts the caller's ringback tone to the conventional tone.

At ringback content input 600, the handset-originated replacement ringback system also includes a search feature to assist the user in finding the correct ringback identification alphanumeric based on the first few letters of the title, genre, or artist of the content. For example, a user entering the letters "REGG" into the search engine might match the "reggae" musical genre, causing the handset-originated replacement ringback system to display a list of all musical content in the reggae genre available on the user's handset to be used as ringback content. Next, the identification alphanumeric is verified by the system at ringback content validation stage 601. Valid identification alphanumerics consist of all the existing and available ringback announcements accessible by the user's handset or the null announcement (for reverting to conventional tones). If an invalid ringback identification is entered, the user repeats ringback content input 600 until a valid identification alphanumeric is entered. After a valid ringback identification is selected, the user next enters the station identification of the calling party that the user wishes to associate with the ringback announcement previously selected at station identification input 602. The user may enter a wildcard character (e.g., the number 0) to match all network addresses. Station verification stage 603 verifies that the station identification entered is valid, and the system proceeds to options input 604. If an invalid station identification is entered, the user returns to station identification input 602 until a valid identification is entered. At options input stage 604, the user inputs optional parameters, including a time reference (e.g., the time of day, day of week, day of month, or month of year), for the delivery of the replacement ringback content. Options verification stage 605 checks the configured parameters for correct syntax and commit stage 606 commits the new replacement ringback association to the system. Thus, the replacement ringback addition may be added to the system in real-time, or, alternatively, if desired the associations may be cached by the network for bulk additions at a later time. If the new ringback association specifies a network address that is already associated with a replacement ringback announcement, the new association takes precedence and overwrites the previous association. Lastly, a message is presented to the user at more associations to process stage 607 inquiring if there are more ringback associations to process. An affirmative answer at more associations to process stage 607 restarts the entire process at ringback content input 600 whereas a negative answer at more associations to process stage 607 exits the handset-originated replacement ringback system and returns the user to the calling system at exit stage 608.

Figure 7:
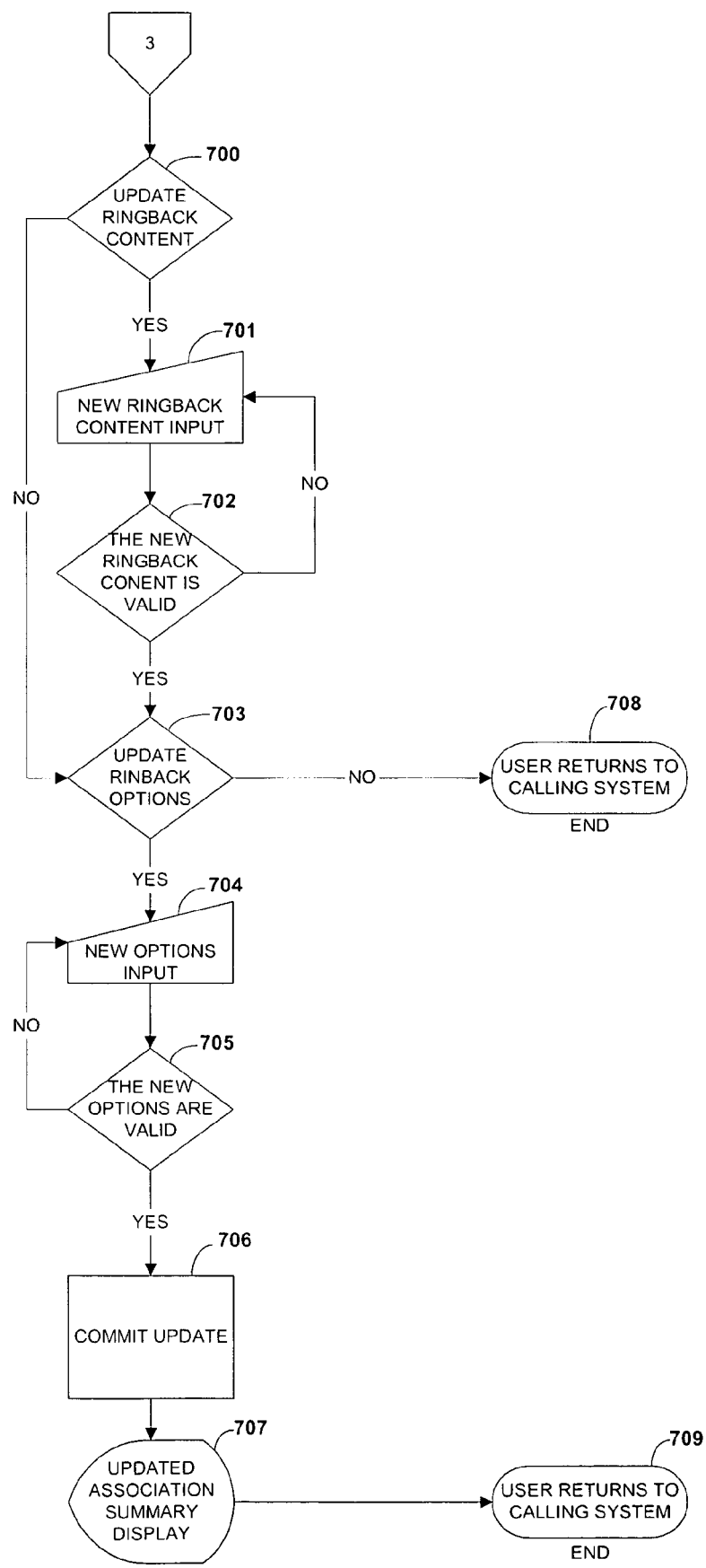
FIG. 7 is a flow diagram illustrating the interaction between a user and the handset-originated replacement ringback system for modifying an already existing ringback association.

If modifications are desired, the user's interaction with the system is depicted in FIG. 7. First, the user decides at update ringback content stage 700 whether the ringback announcement is to be updated. An affirmative answer at update ringback content stage 700 brings the user to the ringback identification input stage 701. The ringback identification is validated at ringback validation stage 702, and the user is presented with options update stage 703. The system also brings the user to options update stage 703 if a negative answer is received at update ringback content stage 700. At options update stage 703, if the user chooses not to process changes to the options of the association, then the user is returned to the calling system at exit stage 708. If modifications to the options are desired, the user inputs these modifications at stage options input 704. The options are checked for appropriate syntax at options validation 705, and the options are committed to the system in real-time at commit stage 706. A summary display shows the updated association at summary display 707, and the user is returned to the calling system at exit stage 709.

Figure 8:
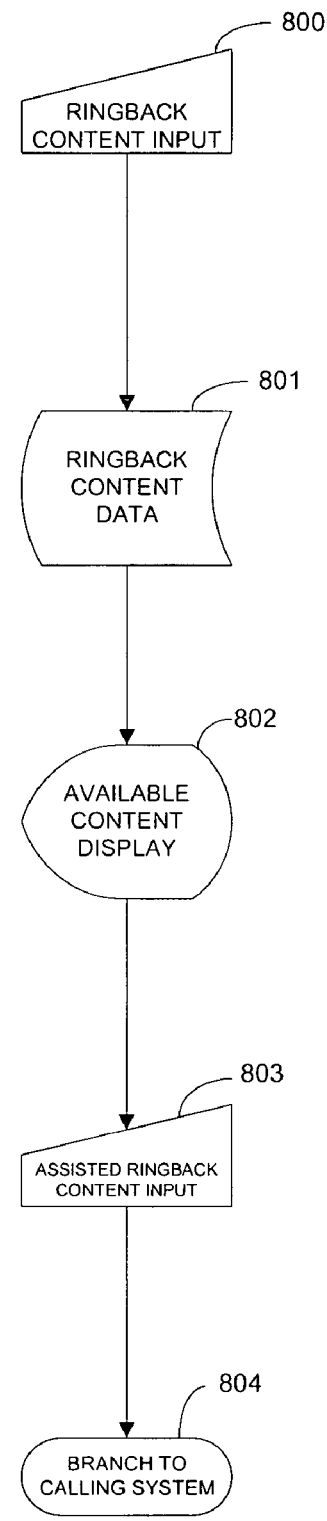
FIG. 8 is a flow diagram illustrating the interaction between a user and the handset-originated replacement ringback system for displaying all ringback content available on the network.

In an alternative embodiment of the present invention depicted in FIG. 8, the user at ringback content input 800 is presented with a menu of available ringback announcements to facilitate entry of ringback identification alphanumeric codes. Ringback content input 800 connects to ringback content data 801, which could be stored locally within the user's handset (e.g., in a database or file) or an external device may be queried to retrieve available ringback content data. The data is formatted and presented to the user in a user-friendly available content display 802. For example, the handset or station may have an integrated menu or list system for displaying lists of information. The user navigates through the list using hard, soft, or attachable keys (or via voice recognition), and highlights the desired ringback content. Assisted ringback content input 803 transfers the content identification alphanumeric corresponding to the selected ringback content to the handset-originated replacement ringback system in lieu of manually entering the alphanumeric. The user is returned to the calling system at branch stage 804.

Figure 9:
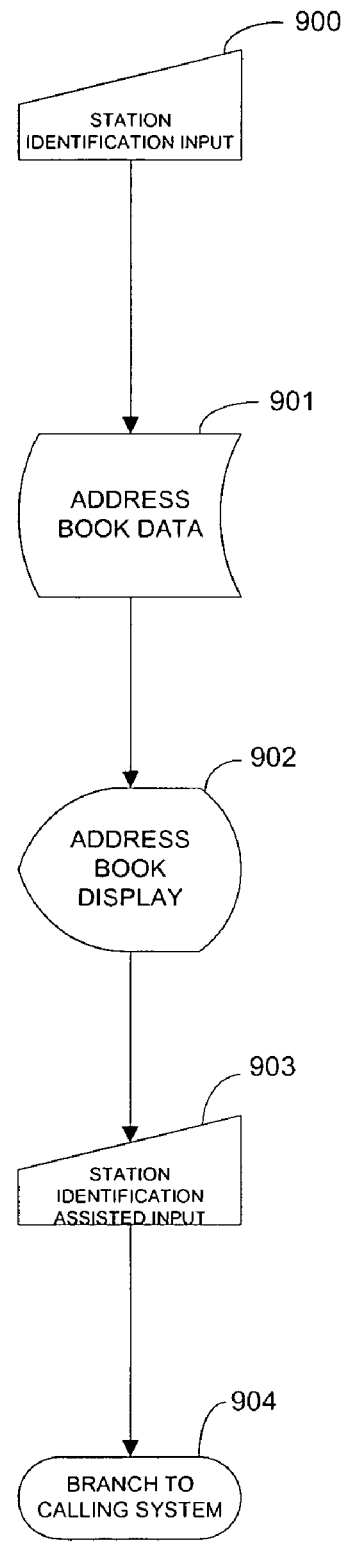
FIG. 9 is a flow diagram illustrating the interaction between a user and the handset-originated replacement ringback system for displaying all network addresses stored on the user's station.

In another embodiment of the present invention depicted in FIG. 9, the handset-originated replacement ringback system links to the user's electronic address book to facilitate inputting network addresses. At station identification input 900, the user is presented with the address book stored on the handset or station that is accessing the handset-originated replacement ringback system. Station identification input 900 connects to address book data 901, stored either on the handset or station itself or on a network location. Address book display 902 lists all the network addresses or telephone numbers contained in the user's address book in a user-friendly menu or list. The user highlights the desired entry and presses the pound ("#") or asterisk ("*") key on the handset to confirm the selection. Station identification assisted input 903 transfers the selected network address or telephone number to the handset-originated replacement ringback system. This obviates the need for manually inputting network addresses, which can be error-prone and time-consuming. The user is returned to the calling system at branch stage 904.

Figure 10:
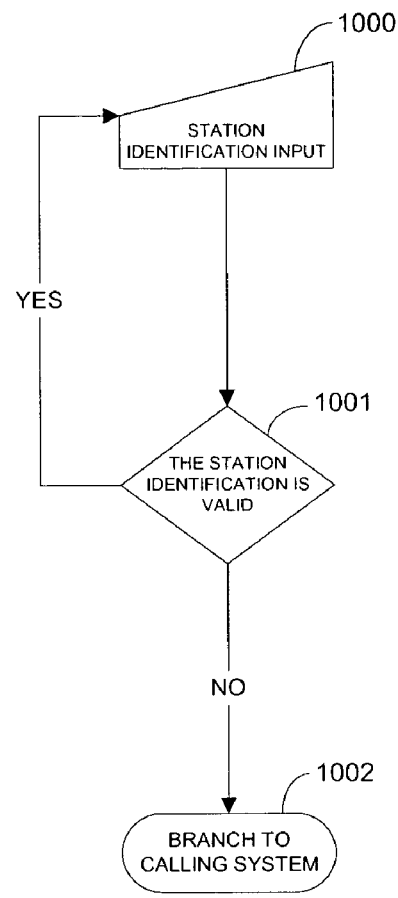
FIG. 10 is a flow diagram illustrating the interaction between a user and the handset-originated replacement ringback system for selecting more than one network address.

An alternative embodiment of the present invention, depicted in FIG. 10, allows a sequence of more than one network address to be entered at station identification 1000. The user enters a first network address at station identification input 1000, followed by the pound ("#") or asterisk ("*") key, and then enters another network address followed by the pound ("#") or asterisk ("*") key. The station identification is verified at station identification validation stage 1001, and, if valid, the user is returned to station identification input 1000 so that additional network addresses may be entered. The user continues this process until satisfied with the sequence and then presses the pound ("#") or asterisk ("*") key twice in succession to signal the conclusion of the network address input stage. An invalid entry causes station identification validation stage 1001 to return the user to the calling system at branch stage 1002. In addition, a user may enter a wildcard character (e.g., the number 0) to match all network addresses.

Figure 11:
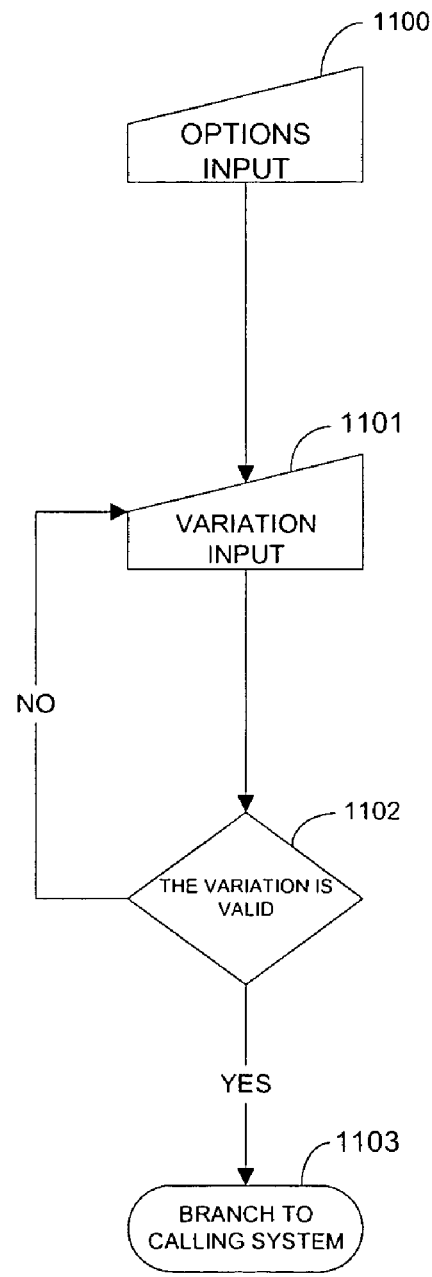
FIG. 11 is a flow diagram illustrating the interaction between a user and the handset-originated replacement ringback system for selecting a ringback playback variation.

In yet another embodiment of the present invention, the user is presented with additional playback options as depicted in FIG. 11. Options input 1100 is supplemented with variations input 1101 for the user to specify certain variations on how the ringback content is presented to the calling party. For example, the user can press the number "1" on the handset keypad to denote that only the replacement ringback should be played; number "2" to denote the playing of a single conventional ringback tone followed by the replacement ringback content; and, number "3" to denote the playing of the conventional ringback tone under the replacement ringback content (i.e. a blended conventional and replacement ringback tone). For example, the user enters the desired selection—"1," "2," or "3"—via the keypad on the user's handset or station at variation input 1101. The variation selection is validated by variation validation stage 1102. Certain ringback content may not be eligible for certain variation options (e.g., an interactive game may not be available to be played under a conventional ringback tone since the conventional ringback tone might interrupt the functionality of the game). These announcements are deemed invalid and the user is returned to variation input 1101 so that a valid variation input may be selected. Once a valid variation option is selected, the user is returned to the calling system at branch stage 1103.

Figure 12:
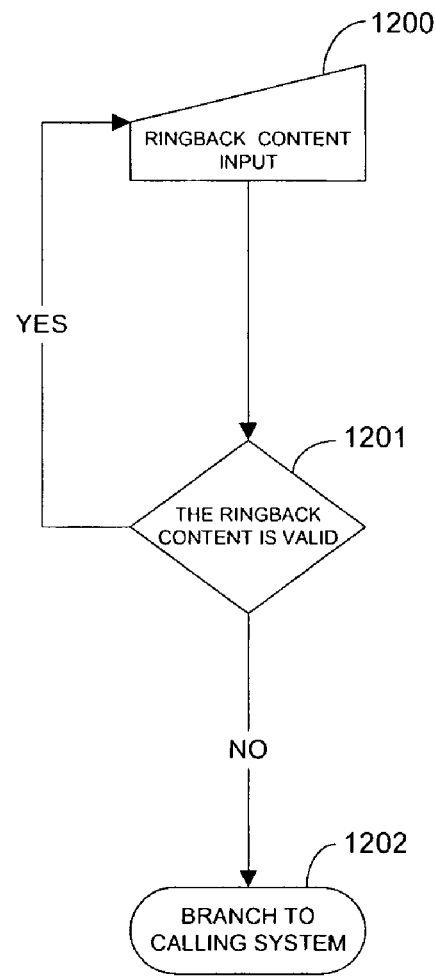
FIG. 12 is a flow diagram illustrating the interaction between a user and the handset-originated replacement ringback system for creating an album of ringback announcements to be played by the replacement ringback system; and, FIG. 13 is a flow diagram illustrating the interaction between a user and the handset-originated replacement ringback system for associating a time reference with a ringback association.

An additional embodiment of the present invention allows a sequence of more than one ringback announcement to be selected as depicted in FIG. 12. At ringback content input 1200, the user enters a first ringback identification alphanumeric, followed by the pound ("#") or asterisk ("*") key and then enters another ringback identification alphanumeric followed by the pound ("#") or asterisk ("*") key. Each alphanumeric is verified by ringback validation stage 1201, and the user continues this process until satisfied with the sequence. The user either presses the pound ("#") or asterisk ("*") key twice in succession or selects an invalid ringback content to signal the conclusion of the ringback content input. The user is then returned to the calling system at branch stage 1202. This embodiment allows a terminal device to create an album of ringback content for the purpose of cycling through the album sequence when replacing a call progress signal. For example, a user might select all the music songs from a particular album by a certain artist. Each time the caller identified by the appropriate network address calls the user, a new song from the designated artist is delivered to the user until all selected songs are delivered, at which point the album begins again.

Figure 13:
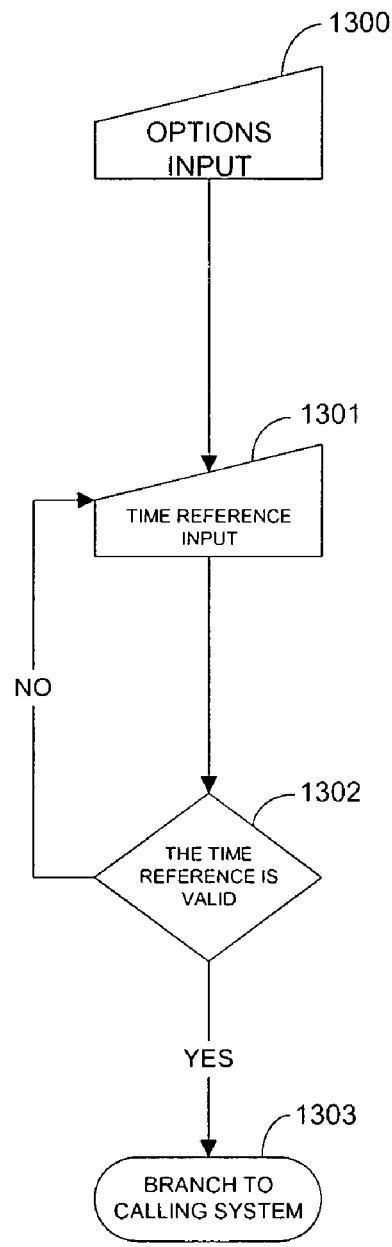

Another embodiment utilizes the clock located within the message generator for the user to select a time reference for the playing of replacement content. Options input 1300 is supplemented by time reference input 1301 of FIG. 13, the user specifies the time of day, day of week, day of month, month of year, or some other time reference (e.g., absolute time measure from present time) to deliver the corresponding announcement. The time reference is verified at validation stage 1302, and if the time reference is deemed invalid (e.g., the time format is incorrect or otherwise invalid), the user is returned to time reference input 1301. Simple logic within the message generator requires the additional matching of the selected time reference in addition to the correct network address; however, if a wildcard network address is selected, the time reference will serve to deliver replacement ringback content to all callers based only on the selected time reference. For example, this allows for a simple way to deliver the same ringback content to all callers calling during a specified time (e.g., midnight through 8 am when the user is typically asleep). Universal associations based on a time reference are trumped by associations based on network address. For example, if calling party "212-555-1212" is associated with a certain interactive game to be used as replacement ringback content and caller "212-555-1212" calls between midnight and 8 am, the caller will be presented with the interactive game rather than the content associated with the late-night time reference. On the other hand, station-specific associations based on a time reference take precedence over associations based on network address. For example, if the above-mentioned late-night association is created using calling party "212-555-1212" as the station identification and the same station identification is associated with another replacement ringback announcement, the caller will hear the content based on the time reference association during all applicable time periods and the content based on network address association at all other times.

From the foregoing description of the preferred embodiments, which embodiments have been set forth in considerable detail for the purpose of making a complete disclosure of the present invention, it can be seen that the present invention comprises a system for seamlessly associating a given network address or telephone number with replacement ringback content directly from a user's handset or station. It will be appreciated by those skilled in the art that changes could be made to the embodiment described above without departing from the broad inventive concept thereof. It is understood, therefore, that this invention is not limited to the particular embodiment disclosed, but it is intended to cover all modifications that are within the scope and spirit of the invention as defined by the appended claims.

What is claimed is:

1. A system for customizing a communications network, the system comprising:
   a first communications device of or associated with a called party;
   a second communications device associated with a network address for initiating a call to said first communications device, wherein said network address is of or associated with a calling party;
   a network storage device containing a plurality of ringback tones and a plurality of network addresses;
   a local storage device containing at least one prerecorded announcement and at least a ringback tone;
   wherein said first communications device accesses said system for the purpose of transmitting a code regarding creating an association between said network address of said plurality of network addresses and one of said at least one prerecorded announcement and said at least one ringback tone of said plurality of ringback tones, wherein said code being transmitted from said first communications device, wherein said code identifies said at least one ringback tone on or said prerecorded announcement, and
   further wherein said system replaces at least a portion of an audible call progress signal intended for said second communications device with said prerecorded announcement or with said at least one ringback tone, wherein one of said prerecorded announcement or said at least one ringback tone being delivered from said network storage device or said local storage device,
   wherein a portion of said call progress signal is replaced after initiation of said call but prior to active communication with said first communications device.

2. A system as defined in claim 1 wherein said call progress signal is selected from a group consisting of ringback signals, busy signals, call waiting signals, and dial tone signals.

3. A system as defined in claim 1 wherein said prerecorded announcement comprises at least one selected from the group consisting of a song clip, an audio clip, a video component, advertising, an interactive and news footage.

4. A system as defined in claim 1 wherein said network address comprises a wildcard address matching all network addresses.

5. A system as defined in claim 1 wherein said association serves to remove all previous associations and revert said call progress signal to conventional tones.

6. A system as defined in claim 1 wherein said communications device comprises at least one selected from the group consisting of a telephone a cellular telephone, a mobile computer, a personal digital assistant, and a communications network.

7. A system as defined in claim 1 wherein said second communications device comprises an integrated or attachable display unit.

8. A system as defined in claim 7 wherein said integrated or attachable display unit features a menu system.

9. A system as defined in claim 8 wherein said menu system can display all said prerecorded announcements available on said communications network.

10. A system as defined in claim 8 wherein said menu system can display all said network addresses stored on said communications device's address book.

11. A system as defined in claim 1 wherein said communications network comprises at least one selected from the group consisting of an interexchange network, a local exchange network, a long distance network, a broadcast network, and a wireless network.

12. A system as defined in claim 1 wherein said first communications device accesses said system via soft keys integrated with said first communications device.

13. A system as defined in claim 1 wherein said first communications device accesses said system via hard keys integrated with said first communications device.

14. A system as defined in claim 1 wherein said first communications device accesses said system via an attachable input device.

15. A system as defined in claim 1 wherein said first communications device accesses said system via a voice recognition module.

16. A method for replacing at least a portion of a call progress signal generated by a communications device with a prerecorded announcement, the method comprising the steps of:
    placing a call by a calling party from a first communications device;
    connecting said call to a second communications device, wherein said second communications device of or associated with a called party, wherein said second communications device associated with a local storage device;
    said second communications device accessing a local storage device containing at least one prerecorded announcement or accessing a network storage device containing at least one ringback tone;
    said second communications device transmitting a code regarding creating an association between a unique identifier associated with said calling party and said prerecorded announcement or said at least one ringback tone, wherein said code identifies said at least one ringback tone or said prerecorded announcement;
    playing said prerecorded announcement from said local storage device or said at least one ringback tone from said network storage device to said first communications device as a call progress signal, wherein said prerecorded announcement replaces a portion of said call progress signals after initiation of said call; and
    terminating the playing of said prerecorded announcement or said at least one ringback tone to said first communications device prior to active communication with said first communications device.

17. The method of claim 16 wherein said call progress signal is selected from a group consisting of ringback signals, busy signals, call waiting signals, and dial tone signals.

18. A system for customizing a communications network, the system comprising:
    a first communications device associated with a called party;
    a second communications device associated with a network address of a calling party;
    a network storage device containing a plurality of ringback tones;
    a local storage device containing at least one prerecorded announcement; and
    ringback association system residing on said first communication device;
    wherein said first communications device accesses said network storage device or said local storage device for the purpose of creating an association between said network address and said prerecorded announcement or a ringback tone of said plurality of ringback tones; and
    wherein said first communications device transmits a code regarding creating an association between a unique identifier associated with said second communications device and said prerecorded announcement, wherein said code identifies said prerecorded announcement on said storage device,
    wherein said first communication device replaces at least a portion of an audible call progress signal intended for said second communications device with one of said prerecorded announcement or said at least one ringback tone, wherein said at least a portion of said audible call progress signal is replaced after initiation of a call from said second communications device to said first communications device but prior to active communication with said second communications device.

19. A method for replacing at least a portion of a call progress signal generated by a communications device with a prerecorded announcement, the method comprising the steps of:
    placing a call by a calling party from a first communications device;
    connecting said call to a second communications device of or associated with a called party;
    said second communications device accessing local a storage device containing at least one prerecorded announcement or accessing a network storage device containing a plurality of ringback tones;
    said second communications device utilizing a ringback association system residing on said second communication device;
    said second communications device transmitting a code regarding creating an association between a unique identifier associated with said calling party and one of said prerecorded announcement or a ringback tone, wherein said code identifies said prerecorded announcement or said ringback tone, said second communications device playing said prerecorded announcement or said ringback tone to said first communications device as a call progress signal, wherein said at least a portion of said audible call progress signal is replaced after initiation of a call from said first communications device to said second communications device;
    said second communications device terminating the playing of said prerecorded announcement or said ringback tone to said first communications device prior to active communication with said first communications device.

* * * * *